Dec. 12, 1950    H. G. KIRKPATRICK    2,534,134
AUTOMATIC TRANSMISSION GEAR BOX
Filed Oct. 14, 1946    2 Sheets-Sheet 1
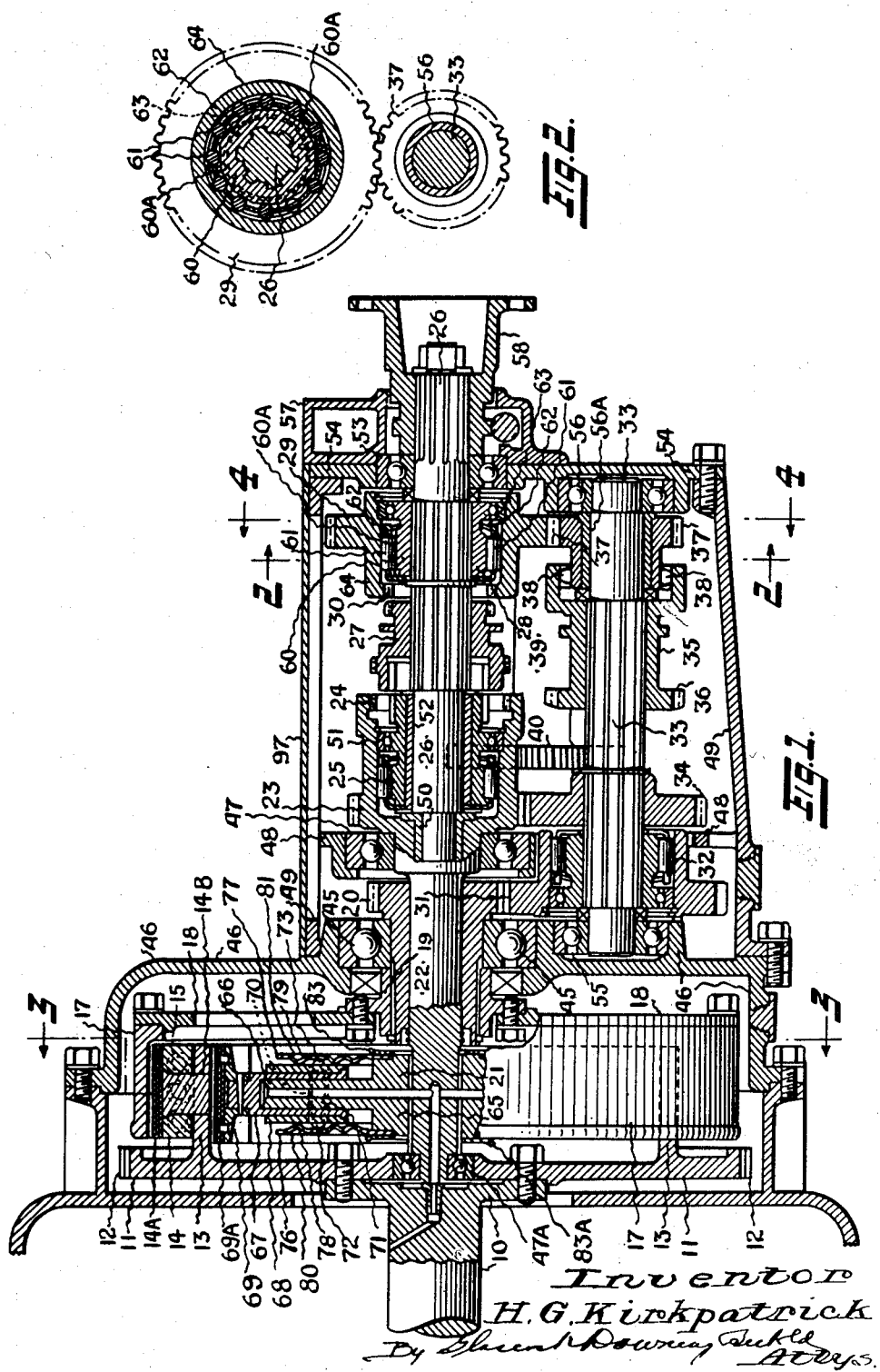
Inventor
H. G. Kirkpatrick Dec. 12, 1950     H. G. KIRKPATRICK     2,534,134
AUTOMATIC TRANSMISSION GEAR BOX
Filed Oct. 14, 1946     2 Sheets-Sheet 2
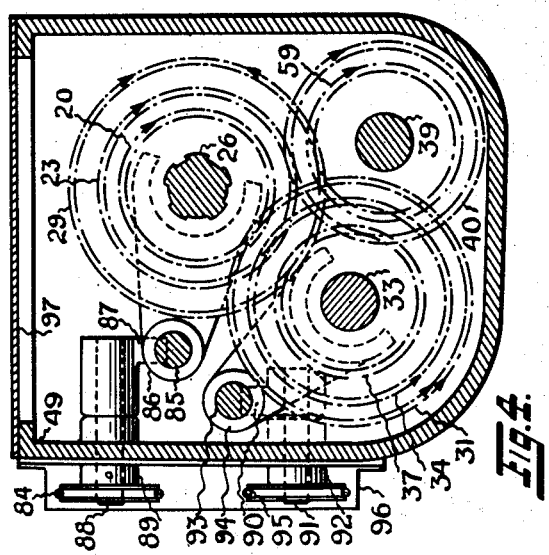
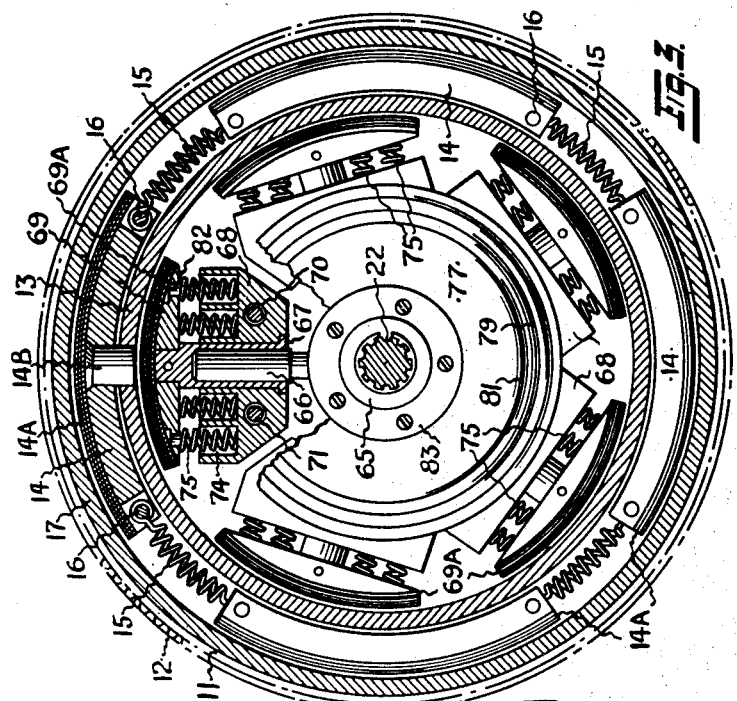
Inventor
H. G. Kirkpatrick Patented Dec. 12, 1950

2,534,134

UNITED STATES PATENT OFFICE 2,534,134

AUTOMATIC TRANSMISSION GEAR BOX

Herwald Gordon Kirkpatrick, Edgecliff, near Sydney, New South Wales, Australia

Application October 14, 1946, Serial No. 703,256
In Australia November 13, 1945

5 Claims. (Cl. 74—330)

This invention relates to improved methods of construction and operation of an automatic transmission gear of a relatively light weight and at a relatively low cost.

The unit is an automatic gear box employing automatic clutches operating at predetermined speeds. It consists of four gear ratios in two stages, high and low, each stage having two automatic gear ratios. The operation of changing from one stage to the other is manual by the movement of a lever which operates a tooth clutch engaging or disengaging with a roller clutch which is permitted to over-run the drive shaft thus enabling easy clutching at any speed. The same handle also operates reverse, engine braking and a neutral position for tuning or warming up engine. All gear wheels are in constant mesh, roller clutches of a known form are used to permit the driven members of the preceding gear ratio to be overrun when an automatic clutch operates at a predetermined speed and takes the drive from a primary clutch.

Referring now to the accompanying drawings which illustrate a transmission gear unit according to the invention:

Figure 1 is a longitudinal sectional side elevation.

Figure 2 is a cross sectional elevation taken on line 2—2 of Figure 1.

Figure 3 is a cross sectional elevation taken on the line 3—3 of Figure 1, and

Figure 4 is a cross sectional elevation taken on the line 4—4 of Figure 1.

The transmission unit comprises two compartments, the compartment nearer the engine housing two centrifugal clutches and the rear compartment housing forward and reverse layshafts, gearing and manual controls.

*Primary centrifugal clutch.*—The engine crankshaft 10 has secured thereto a flywheel 11, having a toothed self-starter ring 12 and a drum 13 which supports a plurality of segmental shoes 14 provided with peripheral friction linings 14a. Each shoe has a driving pin 14b slidably extending into an aperture in the drum 13, and springs 15 interconnected to the shoes, the springs being attached to pins 16. The shoes 14 are positioned within a primary drive drum 17 which is secured to a plate 18 in turn secured to a hub 19 which is splined to a hollow input shaft having integral thereto a gear wheel 20.

Within the flywheel drum 13 is a centrifugal clutch means 21 (hereinafter described) which is keyed or splined on the front end of the drive or input shaft 22 of the transmission gear. At its rear end the shaft 22 has integral therewith a driver gear wheel 23 having an extension provided with clutch teeth 24 and the interior surface of which engages the rollers of a free wheel roller clutch 25 which is mounted on the front end of the output shaft 26 on which is slidably mounted a manually operable dog clutch sleeve 27. The output shaft 26 also carries a free wheel roller clutch 28 which supports and engages with the low stage driven gear wheel 29 and which is provided with clutch teeth 30 on an extension thereof. At the rear end of the output shaft 26 is secured a flanged coupling member 58.

The gear wheel 20 meshes with a driven gear wheel 31 anti-clockwise and through the roller friction clutch 32 rotates a layshaft 33 anti-clockwise.

The driver gear wheel 23 (being integral with the input shaft 22) is adapted to rotate anti-clockwise the driven gear wheel 34 mounted on the layshaft 33.

Slidably mounted on the layshaft 33 is a manually operable tooth clutch member 35 provided with reverse gear wheel 36 and a low stage driver gear wheel 37 is rotatably mounted on the layshaft 33 and provided with clutch teeth 38.

The reverse layshaft 39 has secured thereto a gear wheel 40 and a driver gear wheel 59 (Figure 4) which is adapted to rotate the low stage driven gear wheel 29 anti-clockwise.

The gear wheel 20 is supported for rotation by a ball-bearing 45 mounted in the clutch bell housing 46. The drive shaft 22 is supported for rotation by a ball-bearing 47 mounted in a partition 48 of the gear box housing 49, and a ball-bearing 47A mounted in the flywheel 11. The driven or output shaft 26 is supported for rotation at its front end by a bush 50, ball-bearing 51 of the roller clutch 25 and bush 52, and its rear end by ball-bearing 53 mounted in the gear box rear plate 54. The layshaft 33 is supported for rotation by ball-bearing 55 mounted in rear plate of housing bell 46 and ball-bearing 56 mounted in the gear box rear plate 54.

The low stage gear wheel 37 is supported for rotation by bush 56a on the layshaft 33.

The reverse layshaft 39 is supported for rotation by suitable bearings (not shown) mounted in partition 48 of gear box housing 49 and gear box rear plate 54.

A speedometer drive housing 57 is attached to the gear box rear plate 54 and a flanged coupling 58 is secured to rear end of out-put shaft 26. Cover plate 97 is secured to the open top of the gear box and plate 96 covers the control means for the manually operable clutch members.

*Roller clutch.*—Figure 2 illustrates, in detail, the roller clutch 28 (Figure 1). The hub 60 (Figure 2) is splined to the output shaft 26 (Figure 1). The hub 60 (Figure 2) is provided with a series of inclined flats 60A, so that the periphery is of ratchet tooth formation and rollers 61 are mounted in a cage 62 and engage with the inner periphery of drum 64 which is integral with the low stage gear wheel 29 (Figure 1). Wire springs 63 each having one end attached to cage 62 and the other to hub 60 urge the cage in a clockwise direction thus maintaining rollers 61 in contact with flats 60A and the inner periphery of drum 64, so that they are instantly gripped therebetween in a manner now to be pointed out.

In operation the rotation of the low stage driven gear wheel 29 (Figure 1) in a clockwise direction as shown by the arrow (Figure 4) causes rollers 61 (Figure 2) to wedge and drive hub 60 in the same direction and when hub 60 is driven or rotated faster clockwise the rollers 61 are immediately released and permit the hub 60 to overrun the low stage driven gear wheel 29 (Figure 1).

The roller clutch 25 (Figure 1) is of the same construction as the roller clutch 28 (Figure 1). The roller clutch 32 (Figure 1) is of the same construction as the clutch 28 (Figure 1) with the exception that the inclined flats 60A (Figure 2) are reversed, and the springs 63 are reversed so as to urge the cage 62 in an anti-clockwise direction to maintain the rollers 61 in contact with flats 60A, and the inner periphery of an extension of gear wheel 31.

*Secondary centrifugal clutch.*—This clutch is illustrated in detail in Figures 1 and 3. Hub 65 is splined or keyed to the input shaft 22 and is provided with radial driving pins 66 each of which has a sleeve 67, slidable thereon, the inner end of which by means of a flange supports a weight 68, the other end having secured thereto a shoe 69 which has a peripheral friction lining 69A. The weights 68 are slidably mounted on the sleeves and each is provided with two holes 70 in each of which is a spacer 71 for a pair of balls 72 and 73. The weights 68 are also provided with sockets 74 for compression springs 75 which at their outer ends engage with shoes 69.

To the hub 65 are secured spring steel corrugated diaphragms 76 and 77 provided respectively with ramp surfaces 78, 79 and 80 and 81 (Figures 1 and 3) and secured on the hub 65 exteriorly of the steel spring diaphragms 76 and 77 are cover holding rings 83A and 83.

When the hub 65 is rotating centrifugal action causes shoes 69, weights 68 and balls 72 and 73 to move outwardly to engage with ramp surfaces 78 and 79, which surfaces resist further outward movement of the shoes 69 and weights 68 until a predetermined speed has been reached when the resistance will be overcome with the consequence that the balls 72 and 73 tension the steel spring diaphragms 76 and 77 by outward flexing thereof and move up the ramp surfaces 78 and 79 until the shoes 69 engage with engine flywheel drum 13. As the speed further increases the centrifugal action continues to move weights 68 outwards compressing the springs 75 which apply pressure against the shoes 69 and the outward movement continues until balls 72 and 73 move over the crest of the ramp surfaces and engage with ramp surfaces 80 and 81 when the steel spring diaphragms 76 and 77 flex inwardly and the weights 68 engage with shoes 69. The shoes 69 are then engaged with the engine flywheel drum 13.

This condition continues until the engine decelerates and when the speed falls below a predetermined limit decrease of centrifugal force permits the weights to move radially inwardly, the movement being aided by the expansion of the compression springs 75 which will still react against the shoes so that they will continue to be held in engagement with the drum. The pressure exerted by the spring steel diaphragms is thereby overcome and the diaphragms force the weights further radially inward, when the balls 72 and 73 have moved inwardly over the crests of ramp surfaces 80 and 81 and are in engagement with the ramp surfaces 78 and 79. The weights 68 during said further inward movement thereof, then engage the flanges at the inner ends of the slidable sleeves 67 and draw the shoes 69 radially inwardly thus disengaging them from the flywheel drum and thus the clutch is released. A passage system for lubrication of the sliding surfaces of the weights 68 and sleeves 67 is provided and which is supplied from a passage in the engine crankshaft as shown in Figures 1 and 3.

*Manual controls.*—Tooth clutch 27 (Figure 1) slidably mounted on the output shaft 26 is manually operated to change speed either up or down or neutral position to permit the engine to be speeded up for repairing, tuning or warming up, and reversal by clutching teeth 30 of the low stage driven gear wheel 29 to lock same to the output shaft 26 and which also permits the engine to be used as a brake if and when required.

A selection shaft 85 is provided with gear teeth which engage with teeth of a selection pinion or quadrant 87 which is secured to shaft 88 to which is also secured a grooved pulley 89 provided with Bowden wire 84 which extends to the foot of the steering column of the vehicle and is connected to a similar grooved pulley which is mounted on and operated by a shaft attached to and carried up the steering column and fitted with an operating handle. The operation of this tooth clutch member 27 is manual and the neutral position is as shown in Figure 1. To obtain low speed the tooth clutch member 27 remains in neutral thus permitting drive to the driven shaft 26 through the roller friction ratchet 28. To obtain high or top speed the tooth clutch member 27 is clutched to the roller friction ratchet 25 which then directs the power flow direct to the driven shaft 26. Free wheeling can be prevented by clutching teeth 24 of the main drive shaft 22 to the driven shaft 26.

*Tooth clutch 35.*—This tooth clutch is mounted on layshaft 33 and is shown (Figure 1) clutched to the low speed driver gear wheel 37 which is for all forward driving whether in high or low stage, or using the engine as a brake if and when required. For neutral de-clutch the low stage driver gear wheel 37. For reverse mesh the reverse driver gear wheel 39 to the reverse driven gear wheel 40. The selector shaft 93 is provided with teeth engaging with selector pinion or pinion 90 which is attached to selector shaft 91 on which is mounted grooved wheel or pulley 92 to which is attached Bowden wire 95 which extends to the foot of the steering column of the vehicle and attached to a similar grooved wheel which is mounted on and operated by the same shaft which operates tooth clutch 27, such shaft being attached to and carried up the steering column and fitted with a handle.

These tooth clutches are interconnected so that when the handle is manually moved to a neutral position both clutches are in neutral.

Operation

*Forward driving—Automatic gear changing up: Automatic neutral.*—The rotation of flywheel drum 13 by engine crankshaft 10 at engine idling speed (approximately 400/600 R. P. M.) or below idling speed imparts centrifugal force to the clutch shoes 14 but not sufficient to move them outwardly and tension the springs 15 (Figure 3) so that the shoes engage with the primary drive drum 17. Thus the engine can run at idling or below idling speed without rotating the output or tailshaft when the transmission is as shown in Figure 1 in neutral position.

The transmission is manually operated in two stages (high and low) each stage having two automatic gear ratios.

*Low stage.*—To operate the transmission in low stage the tooth clutch member 27 must be in the neutral position (as shown Figure 1) while the tooth clutch member 35 must be clutched to the low stage gear wheel 37 (as shown in Figure 1). The manual positioning of both these tooth clutches can be effected before the engine is started or when the engine is rotating at idling or below idling speed and then it is only necessary to move tooth clutch member 27 to alter stages which can be done easily at any speed.

*Lowest speed or fourth automatic gear drive (low gear).*—Rotation of flywheel drum 13 and acceleration above idling speed imparts sufficient centrifugal force to shoes 14 so that springs 15 are tensioned (Figures 3 and 4) and the shoes engage by their friction coverings 14A with the primary drive drum 17, which through plate 18 and hub 19 drives the gear wheel 20 in clockwise direction (Figure 4) which in turn rotates the gear wheel 31 in anti-clockwise direction (Figure 4) and through roller clutch 32 rotates layshaft 33 in anti-clockwise direction (Figure 4) which being clutched by 35 to the low stage driver gear wheel 37 also rotates the latter in anti-clockwise direction (Figure 4) which in turn rotates the low stage driven gear wheel 29 clockwise and through the roller clutch 28 rotates the output shaft 26 clockwise (Figure 4) in fourth (low) gear ratio speed or drive.

*Low speed or third automatic gear drive.*—During the fourth or low gear drive operation the layshaft 33 is rotating the gear wheel 34 in anti-clockwise direction (Figure 4) which is rotating the gear wheel 23 integral with the input shaft 22 and the automatic clutch means 21 clockwise. When a predetermined speed is reached the clutch means operates and the shoes 69 engage with the engine flywheel drum 13 which takes over the drive from the primary drive drum 17 and at engine speed rotates the gear wheel 23 clockwise which rotates the driven gear wheel 34, layshaft 33 and low stage driver gear wheel 37 anti-clockwise which rotates the low stage driven gear wheel 29 clockwise and through the roller friction ratchet 28 drives the output shaft 26 clockwise in third gear ratio speed or drive. This drive is only made possible by reason of the roller clutch 32 permitting the driven gear 34 to rotate faster than, or over-run, the gear 31 which is still being rotated by the gear 20 which in turn is being driven by the primary drive drum 17 which is still being driven at engine speed.

*Manual changing from low stage to high stage.*—When the operator or driver considers the high stage or second gear should be brought into operation he decelerates the engine (thus relieving the load) and manually operates tooth clutch member 27 by clutching the roller clutch 25 to the driven shaft 26 when the roller clutch 28 permits the drive to be immediately directed to the output shaft 26. The roller clutch 25 permits easy clutching at any speed as it can at all times over-run the input shaft 22. To prevent free wheeling clutch teeth 24 to the tooth clutch 27.

*High stage or second automatic gear drive.*—The primary drive drum 17 still being engaged with the engine drives the driver gear wheel 20 clockwise which drives the driven gear wheel 31 anti-clockwise and through roller clutch 32 rotates the layshaft 33 and driven gear wheel 34 anti-clockwise which drives the driver gear wheel 23 clockwise and through roller clutch 25 clutched to the output shaft 26 drives the latter clockwise in second gear ratio or drive. This drive is only made possible by roller clutch 28 permitting the output shaft 26 to over-run the low stage driven gear wheel 29.

*High stage or top automatic gear drive.*—During the second gear operation the driver gear wheel 23, the main drive shaft 22 and the automatic clutch 21 are being rotated clockwise until a predetermined speed is reached when the automatic clutch 21 operates and engages with the engine flywheel drum 13 and takes the drive from the primary drive drum 17 and rotates the secondary input shaft 22 at engine speed and through the roller clutch 25 rotates the output shaft 26 at engine speed or highest gear ratio. This drive is only made possible by reason of the roller clutch 32 permitting the driven gear wheel 34 to rotate faster than the driven gear wheel 31 and the roller clutch 28 permitting the driven output shaft 26 to rotate faster than the low stage driven gear wheel 29.

Changing down

*Forward driving—automatic changing down.*—When the automatic clutch 21 engages with the engine flywheel drum 13 both clutches are engaged with the engine and when the output shaft falls to predetermined speeds the clutches in rotation disengage until the tailshaft stops rotation and the engine rotates at idling speed.

*Automatic changing down from top to second.*—When the driven shaft 26 which is clutched to the main drive shaft 22 falls to a predetermined speed the automatic clutch means 21 acts so that shoes 69 become disengaged from the engine flywheel drum 13 when the top gear driving immediately ceases but as the shoes 14 are still engaged with the primary drive drum 17 the latter continues to drive at the gear wheel 20, at engine speed, which drives the driven gear wheel 31 anti-clockwise and through roller clutch 32 drives the layshaft 33 and driven gear wheel 34 anti-clockwise which drives the gear wheel 23 clockwise and through the roller clutch 25 clutched to the output shaft 26 drives the latter clockwise in second gear ratio speed or drive. The roller clutch 28 permits the output shaft 26 to over-run or rotate faster than the low stage gear wheel 29.

*Manual changing from high stage to low stage.*—When the operator or driver considers the low stage or third gear ratio should be brought into operation he immediately decelerates the engine relieving the load and manually disengages the tooth clutch 27 with the roller clutch 25 (as shown in Figure 1) when the drive is immediately directed to and through the roller clutch 28.

*Low stage automatic third gear.*—The shoes of the automatic clutch means 21 being still engaged with the drum 13, the input shaft 22 and the driver gear wheel 23 rotate clockwise and the latter rotates the driven gear wheel 34, layshaft 33 and the low stage driver gear wheel 37 anti-clockwise which rotates the low stage driven gear wheel 29 clockwise and through the roller clutch 28 rotates the output shaft 26 clockwise in third gear ratio speed or drive. This drive is made possible by the roller clutch 32 permitting the driven gear wheel 34 to be rotated faster than the driven gear wheel 31.

*Low stage automatic changing from third to fourth (low gear).*—When the driven or output shaft 26 falls to a predetermined speed the shoes of the automatic clutch means 21 disengage from the engine flywheel drum 13 when the third gear ratio driving immediately ceases but as the primary drive drum 17 is still engaged with the engine, it continues to drive the driver gear wheel 20 at engine speed which drives the driven gear wheel 31 anti-clockwise and through the roller clutch 32 drives the layshaft 33 and the low stage driver gear wheel 37 anti-clockwise which rotates the low stage driven gear wheel 29 clockwise and through the roller friction ratchet 28 drives the driven or output shaft 26 clockwise in fourth (low) gear ratio speed or drive. By manually operating clutch sleeve 27 the low stage driven gear wheel 27 can be clutched to the output shaft 26 and so eliminate the use of the roller clutch 28.

*Changing down from fourth to zero.*—When the speed of the output shaft 26 falls to zero the centrifugal force imparted to the shoes 14 by the rotation of the engine flywheel drum 13 is overcome by the springs 15 which withdraw the shoes 14 inwards and disengage them from the primary drive drum 17 when the engine continues to rotate at idling speed and the output shaft 26 is stationary.

*Reverse gear drive.*—This drive is operated manually. Firstly, clutch the low stage driven gear wheel 29 to the output shaft 26 and de-clutch the low stage driver gear wheel 37 and engage the reverse drive gear wheel 36 with the reverse driven gear wheel 40 and by accelerating the engine the fourth gear ratio speed or drive operates and drives the reverse layshaft 39 clockwise which drives the reverse driver gear wheel 59 clockwise which rotates the low stage driven gear wheel 29 anti-clockwise which being clutched to the output shaft 26 drives the latter anti-clockwise in reverse gear ratio speed or drive.

*Engine braking.*—If it is desired to use the engine as a brake then by manually operating the tooth clutch member 27 so as to clutch or lock the low stage driven gear wheel 29 to the output shaft 26 and manually operate the tooth clutch member 35 to clutch the low stage driver gear wheel 37 to the layshaft 33 (which is the normal clutching for forward driving) then when the output shaft 26 rotates at a speed faster than the engine the low stage driven gear wheel 29 rotates the low stage driver gear wheel 37, the layshaft 33, and the driven gear wheel 34 anti-clockwise which rotates the driver gear wheel 23 and the input shaft 22 and automatic clutch means 21 clockwise until the speed is such that the shoes of the automatic clutch means engage with the engine flywheel drum 13 so that the engine then acts as a brake in the third gear ratio speed or drive.

*Neutral.*—A neutral position in the transmission enabling the engine to run at speeds above idling speed (400/600 R. P. M.) can be obtained by manually moving the tooth clutch member 27 into a neutral position (as shown Figure 1) and tooth clutch member 35 into neutral position.

*General.*—The automatic clutches permit disengagement to take place at lower speeds than engagement. The use of the engine throttle can effect quick gear changes if required.

The road speeds which may be adopted for the changing of gears are as follows:

Low stage

Fourth gear speed____ zero M. P. H.–10 M. P. H.
Third gear speed_____ 5 M. P. H.–17 M. P. H.

Top stage

Second gear speed_____ 7 M. P. H.–22 M. P. H.
Top gear speed_____ 12 M. P. H.–maximum speed of engine.

*Free wheeling.*—Free wheeling of the driven shaft over-running the engine can be obtained manually by the operation of the tooth clutch member 27 by de-clutching the clutch teeth 24 of main drive shaft 22 which permits the roller clutch 25 clutched to the driven shaft 26 to over-run the main drive shaft 22.

I claim:

1. A gear box having an input shaft, an output shaft, a drive shaft, coupling means including an overrunning clutch for coupling the drive shaft to the output shaft so that the drive shaft can drive the output shaft but the output shaft can overrun the drive shaft, a second drive shaft, coupling means between the second drive shaft and the output shaft, a clutch for coupling the first drive shaft to the input shaft and centrifugal means for controlling the automatic engagement of the clutch at a predetermined speed of the input shaft, a second clutch for coupling the second drive shaft to the input shaft and centrifugal means driven by the second drive shaft for controlling the automatic engagement of the second clutch at a higher predetermined speed and the automatic release of the second clutch at a predetermined lower speed than its speed of engagement.

2. A gear box having an input shaft, a layshaft, an output shaft, a drive shaft, coupling means including an overrunning clutch for coupling the drive shaft to the lay-shaft so that the drive shaft can drive the lay shaft but the lay-shaft can overrun the drive shaft, a second drive shaft, coupling means between the second drive shaft and the lay-shaft, a clutch for coupling the first drive shaft to the input shaft and centrifugal means for controlling the automatic engagement of the clutch at a predetermined speed of the input shaft, a second clutch for coupling the second drive shaft to the input shaft and centrifugal means driven by the second drive shaft for controlling the automatic engagement of the second clutch at a higher predetermined speed and the automatic release of the second clutch at a predetermined lower speed than its speed of engagement, and coupling means including a second overrunning clutch for coupling the lay-shaft to the output shaft so that the lay-shaft can drive the output shaft but the output shaft can overrun the lay-shaft.

3. A gear box having an input shaft, a layshaft, an output shaft, a drive shaft, coupling means including an overrunning clutch for coupling the drive shaft to the lay-shaft so that the drive shaft can drive the lay-shaft but the lay-shaft can overrun the drive shaft, a second drive shaft, coupling means between the second drive shaft and the lay-shaft, a clutch for coupling the first drive shaft to the input shaft and centrifugal means for controlling the automatic engagement of the clutch at a predetermined speed of the input shaft, a second clutch for coupling the second drive shaft to the input shaft and centrifugal means driven by the second drive shaft for controlling the automatic engagement of the second clutch at a higher predetermined speed and the automatic release of the second clutch at a predetermined lower speed than its speed of engagement, and a manually operable clutch for coupling the second drive shaft to the output shaft.

4. A gear box having an input shaft, a lay-shaft, an output shaft, a drive shaft, coupling means including an overrunning clutch for coupling the drive shaft to the lay-shaft so that the drive shaft can drive the lay-shaft, but the lay-shaft can overrun the drive shaft, a second drive shaft, coupling means between the second drive shaft and the lay-shaft, a clutch for coupling the first drive shaft to the input shaft and centrifugal means for controlling the automatic engagement of the clutch at a predetermined speed of the input shaft, a second clutch for coupling the second drive shaft to the input shaft and centrifugal means for controlling the automatic engagement of the second clutch at a higher predetermined speed and the automatic release of the second clutch at a predetermined lower speed than its speed of engagement, and clutch means including a manually operable clutch and a second overrunning clutch for coupling the output shaft to the second drive shaft in two stages, in the first stage through the overrunning clutch and in the second stage directly.

5. A gear box having an input shaft, a lay-shaft, an output shaft, a drive shaft, coupling means including an overrunning clutch for coupling the drive shaft to the lay-shaft so that the drive shaft can drive the lay-shaft but the lay-shaft can overrun the drive shaft, a second drive shaft, coupling means between the second drive shaft and the lay-shaft, a clutch for coupling the first drive shaft to the input shaft and centrifugal means for controlling the automatic engagement of the clutch at a predetermined speed of the input shaft, a second clutch for coupling the second drive shaft to the input shaft and centrifugal means for controlling the automatic engagement of the second clutch at a higher predetermined speed and the automatic release of the second clutch at a predetermined lower speed than its speed of engagement, and coupling means including a second overrunning clutch and a manually operable clutch for coupling the lay-shaft to the output shaft so that the lay-shaft can drive the output shaft, and so that in one position of the manually operable clutch the output shaft can overrun the lay-shaft, and in the other position of the manually operable clutch the output shaft cannot overrun the lay-shaft.

HERWALD GORDON KIRKPATRICK.

REFERENCES CITED

The following references are of record in the file of this patent:

UNITED STATES PATENTS

| Number | Name | Date |
| --- | --- | --- |
| 1,606,544 | Vail | Nov. 9, 1926 |
| 2,058,736 | Stauffer et al. | Oct. 27, 1936 |
| 2,183,761 | Aspinwall et al. | Dec. 19, 1939 |